Aug. 12, 1958  S. R. PUTNAM  2,846,768
SUNDIAL
Filed July 11, 1956

Stephen R. Putnam
INVENTOR

United States Patent Office 2,846,768
Patented Aug. 12, 1958

2,846,768

SUNDIAL

Stephen R. Putnam, Scituate, Mass.

Application July 11, 1956, Serial No. 597,241

2 Claims. (Cl. 33—62)

This invention relates to improvements in sundials. One object of this invention is to provide an easily read and simple sundial that will indicate the time regardless of the length of the day. Another object of this invention is to provide a sundial which is easily corrected for: the longitude difference between the sundial and the meridian associated with the local time zone; the difference between mean solar time and apparent solar time; and the annual change to daylight saving time.

A preferred embodiment of the invention is illustrated in the accompanying drawing in which.

Figure 2:
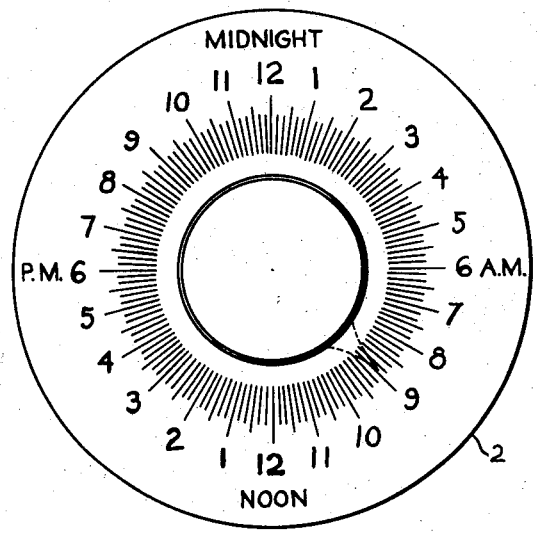
Fig. 2 is a view of the sundial in the direction indicated by the line 2—2 of Figure 1.
Figure 1:
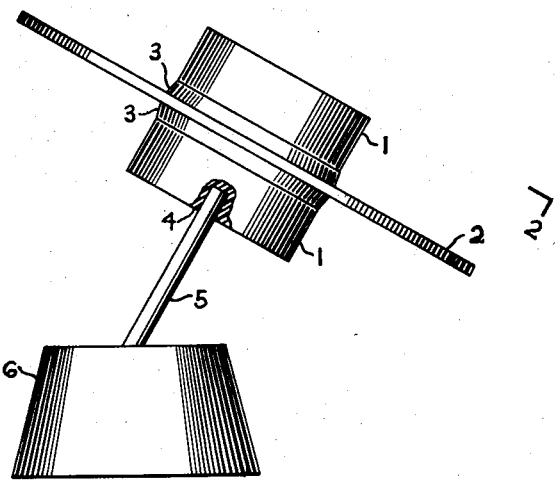
Fig. 1 is a side view of the sundial.

Referring to the drawing, the sundial is comprised of two principal parts; these are a gnomon 1 and a dial 2. The gnomon 1 is made of transparent material and has the general form of a cylinder, the axis of which is aligned parallel to the earth's axis. The dial 2 is a flat sheet of translucent material surrounding the gnomon 1 at the mid-point thereof and perpendicular to the gnomon's 1 axis. The twenty-four hours of the day are marked around the dial 2 with the gnomon 1 as a center. The plane of the dial 2 is parallel to the plane of the earth's equator.

The sun's rays, upon passing through the gnomon 1, are refracted and caused to emerge in a converging wedge of light. This wedge of light produces a pointer of light upon the dial 2 in the area where the dial 2 intercepts it. When the sun is above the equator, the rays of light emerging from the gnomon 1 are directed downward onto the upper surface of the dial 2. When the sun is below the equator, the rays of light emerging from the gnomon 1 are directed upward onto the lower surface of the dial 2 but the pointer of light so produced is visible from the upper side of the dial 2 due to the dial 2 being translucent. When the sun is exactly on the equator, its rays are parallel to the dial 2, but after passing through the gnomon 1, they are inclined toward the dial 2 due to the focusing effect of the flare 3 of the gnomon 1 surface adjacent to the dial 2.

One method of supporting the sundial is illustrated by the drawing. The bottom of the gnomon 1 is provided with a cylindrical socket 4, the axis of which is parallel to the axis of the gnomon 1. This socket 4 fits on the end of a rod-shaped projection 5 of the base 6 with a light friction fit. With this type of support, the sundial can be set to indicate the correct local time simply by rotating the sundial about its own axis until the time corresponds with that of an accurate local timepiece.

What I claim is:

1. In a sundial, a cylindrical transparent gnomon having its axis of symmetry parallel to the earth's axis, the gnomon protruding from both sides of a flat translucent dial, the gnomon refracting the sun's rays and thereby causing the emergent rays to be concentrated into a wedge of light, the emergent rays intercepted by the dial thus creating a pointer of light which moves around the dial with the movement of the sun, markings on the dial dividing its surface into units of time and means permitting the dial to be rotated about the axis of the gnomon whereby it may be set to the correct time.

2. A sundial as specified in claim 1 in which the gnomon is flared adjacent to the dial thereby causing the sun's rays, which are sometimes parallel to the dial, to be deflected toward the dial so that the dial may intercept them and make them visible as a pointer of light.

References Cited in the file of this patent

UNITED STATES PATENTS

| 35,225 | Flechet | May 13, 1862 |
| 1,674,161 | De Bogory | June 19, 1928 |

FOREIGN PATENTS

| 607,597 | Germany | Jan. 3 1935 |